United States Patent [19]

Gauriat et al.

[11] 4,041,392
[45] Aug. 9, 1977

[54] SYSTEM FOR SIMULTANEOUS TRANSMISSION OF SEVERAL PULSE TRAINS

[75] Inventors: Gilles Gauriat, Paris; Jacques Vernezy, Viroflay; Jean-Claude Barigot, Brie Comte Robert, all of France

[73] Assignee: Compagnie Industrielle des Telecommunications Cit-Alcatel S. A., Paris, France

[21] Appl. No.: 702,326

[22] Filed: July 2, 1976

[30] Foreign Application Priority Data

July 4, 1975   France ................................ 75.21091

[51] Int. Cl.² ........................... H04B 1/00; H04L 7/00
[52] U.S. Cl. ................................... 325/38 A; 325/30; 325/39; 179/15 AP; 178/67; 178/69.1
[58] Field of Search ................... 325/38 A, 39, 40, 30; 179/15 BS, 15 BA, 15 AP, 15 BC; 360/40; 178/67, 68, 69.1; 343/203

[56] References Cited

U.S. PATENT DOCUMENTS

| 2,912,684 | 11/1959 | Steele | 178/67 |
| 3,467,777 | 9/1969 | Rumble | 178/67 |
| 3,659,053 | 4/1972 | Low | 179/15 BC |
| 3,828,346 | 8/1974 | Forster | 325/38 A |
| 3,949,298 | 4/1976 | Boxall | 179/15 AP |

Primary Examiner—Robert L. Griffin
Assistant Examiner—Michael A. Masinick
Attorney, Agent, or Firm—Sughrue, Rothwell, Mion, Zinn and Macpeak

[57] ABSTRACT

A main pulse train at a main frequency and at least two derived pulse trains at submultiples of the main frequency are transmitted over a transmission path, from a transmitter to a receiver, in the form of pulses of alternating polarity. A first one of the derived pulse trains is transmitted as a single violation of bipolarity in the main pulse train while a second one of the derived pulse trains is transmitted as two successive violations of bipolarity in the main pulse train. The system is applicable to multiple synchronization (bit, frame etc . . . ) in a PCM digital transmission or switching system.

8 Claims, 2 Drawing Figures

4,041,392

SYSTEM FOR SIMULTANEOUS TRANSMISSION OF SEVERAL PULSE TRAINS

BACKGROUND OF THE INVENTION

The invention relates to the transmission of binary signals and, more particularly, to a system for the transmission of a main pulse train having a frequency of F, and of two derived pulse trains, having respective frequencies of F/N and of F/K. N (where k and N are positive integers 1, 2, ... ) the pulses of the derived pulse trains being arranged not to coincide with one another, the system comprising a transmitter, a transmission channel and a receiver.

When digital data is transmitted, a distinction is often made between "bit" synchronization and "frame" synchronization, the data being grouped together in a digital train in blocks or frames of N bits. To obtain correct synchronism between two units of equipment, not only must a bit synchronizing signal be transmitted, but other synchronizing signals must also be transmitted, e. g. for frame synchronization. According to a known technique, a distinct transmission path, e. g. a pair of wires or a channel in a multiplex, is provided for the transmission of each synchronizing signal.

It has already been proposed to reduce the number of transmission paths used for synchronization by grouping together a main pulse train and a derived pulse train in a single bipolar channel. The pulses of the derived pulse train are transmitted as violations of the bipolarity of a bipolar pulse train having a frequency F.

SUMMARY OF THE INVENTION

The present invention provides a system for transmitting a main pulse train at a main frequency and at least two derived pulse trains at submultiples of the main frequency, the frequencies and phase positions of the derived pulse trains being so chosen that the pulses of the derived pulse trains do not coincide, the system comprising a transmitter and a receiver capable of being interconnected by a transmission path, wherein the transmitter includes a bipolar signal generator which has an input for the main pulse train and an output for the transmission part at which output alternate pulses of the main pulse train appear as pulses of alternate polarity, and which further includes a "bipolarity violation" input on which an inhibit pulse coinciding with a pulse from the main pulse train will prevent an alternation of the polarity of the output, the "bipolarity violation" input being connected to receive a first one of the derived pulse trains directly and a second one of the derived pulse trains via a circuit for causing a pulse of the second derived pulse train to prevent two successive alternations of the polarity of the output, and wherein the receiver includes means for detecting and distinguishing single and double violations of bipolarity.

BRIEF DESCRIPTION OF THE DRAWINGS

An embodiment of the invention will be described hereinbelow in greater detail by way of example with reference to the accompanying drawings in which.

DESCRIPTION OF THE PREFERRED EMBODIMENT

Figure 2:
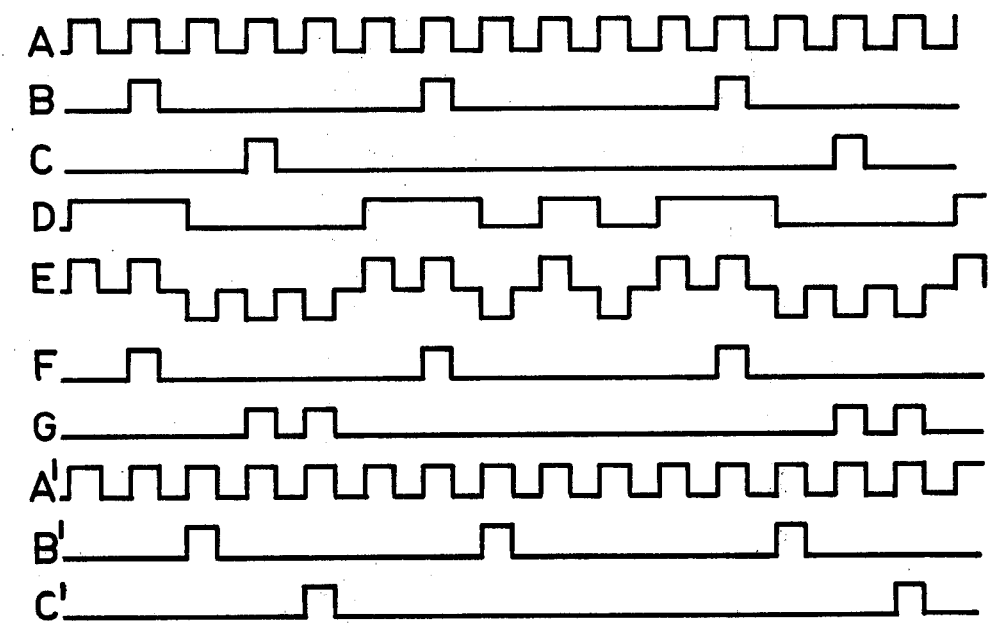
FIG. 2 shows a set of wave forms relating to the operation of the system of FIG. 1.

In FIG. 2, wave form A shows the form of a pulse train called the main pulse train, and wave forms B and C show two pulse trains derived from the main pulse train.

The first of these derived pulse trains has a frequency of one fifth that of the main pulse train, whereas the second has a frequency of one tenth that of the main pulse train ($N = 5$; $k = 2$). In practice, $N$ and $k$ are often chosen much greater than that. The pulse of the two derived trains never coincide.

Figure 1:
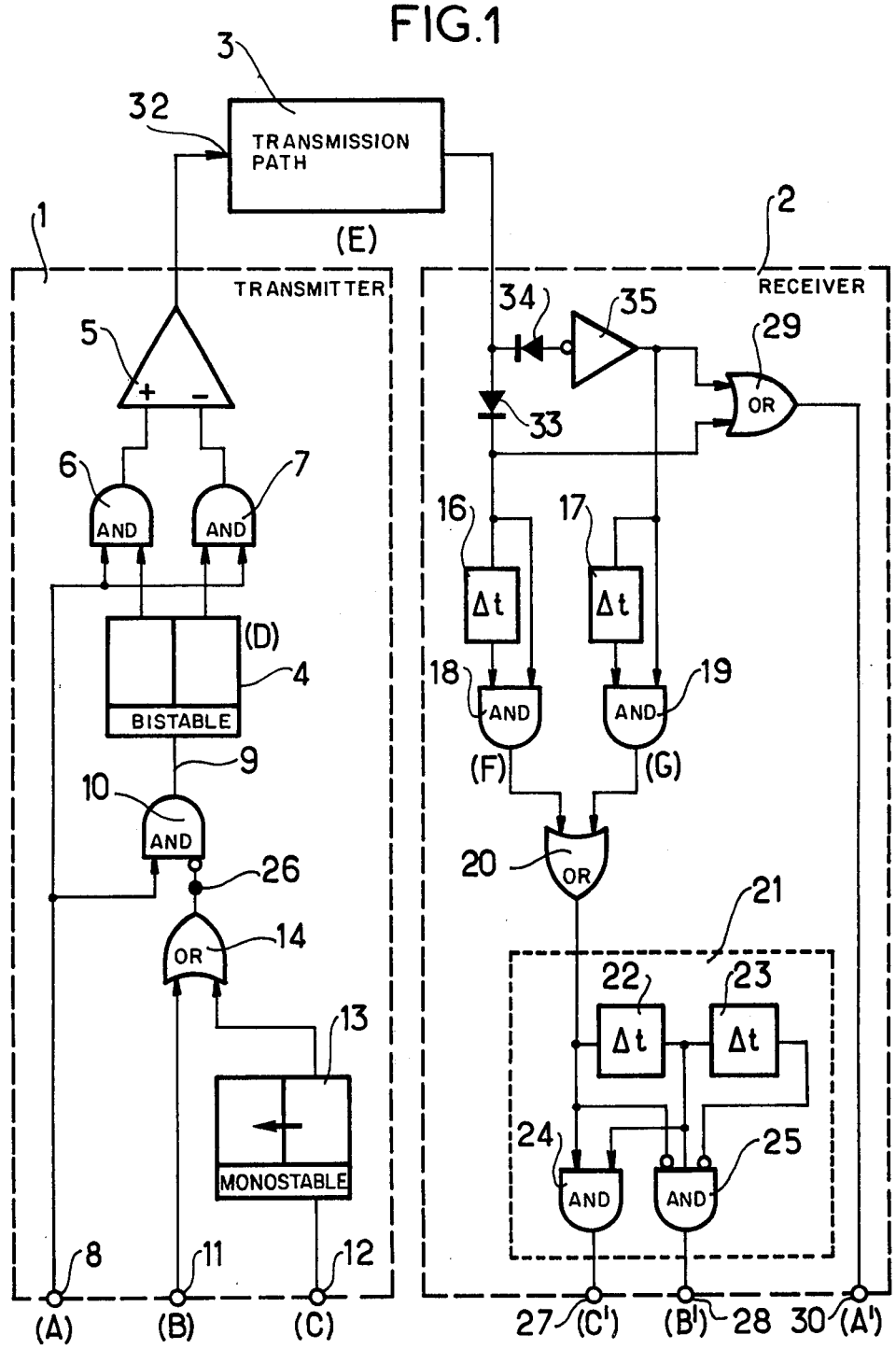
FIG. 1 is a circuit diagram of the system as a whole.

FIG. 1 shows a transmitter 1 on the left hand side and on the right hand side a receiver 2.

The transmiter 1 and receiver 2 are connected together by a transmission path 3, which man be of any suitable type. The transmitter comprises a bipolar pulse generator consisting of a bistable 4, a differential amplifier 5 having unit gain and two AND gates 6 and 7 which receive the pulses of the main pulse train A applied to an input 8 and transfer them alternately to the positive and to the negative inputs of the amplifier 5, whose output is connected to the input 32 of the path 3. This alternation is obtained by the bistable flip-flop 4, whose two complementary outputs are connected to different ones of the two gates 6 and 7.

The bistable 4 receives pulses on a trigger input 9 to make a binary state change. The trigger input 9 is controlled by an AND gate 10 which receives the main signal on one input terminal and the derived B pulse train of frequency F/N on another input terminal 26, which is an inverting input. The B pulse train is applied to an input 11 of the transmitter.

The bistable 4 therefore changes state in synchronism with the main pulse train, except when inhibited at instants when the inversion input 26 of the gate 10 receives a pulse.

Such an inhibiting pulse does not only come from the input 11, but can also come from an input 12 of the transmitter, which receives the second derived signal C. The input 12 is connected to a monostable 13, whose period of stability is slightly longer than the repetition period of the main pulse train. When a pulse arrives at the input 12 (see wave form C in FIG. 2), the monostable 13 changes its state and immediately closes the gate 10, for a duration of two successive pulses of the main pulse train. The B pulse train coming from the input 11 and the pulse coming from the monostable 13 are combined in an OR gate 14.

The operation of the transmitter can be deduced directly from the above description. Wave form D shows the binary state of the bistable 4. The state of the bistable 4 changes on the rising edge of each pulse of the main pulse train except when inhibited by a pulse of either one of the derived pulse trains B or C, or when further inhibited by the monostable "stretching" a pulse of the C pulse train to cover two successive rising edges of the A train. The signal transmitted via the path 3 has a wave form E ; this signal is a bipolar signal having a frequency of F.

At the receiver 2, the three original pulse trains are to be restored. This requires firstly a separation of the positive pulses from the negative pulses (by diodes 33 and 34) and the inversion of the negative pulses (by inverter 35). Then, the two partial trains are checked for two successive pulses having the same polarity. For this purpose, a delay line 16 or 17 is provided for each partial train. The delay of the delay lines 16 and 17 is one period of the main pulse train and the input and the output of each of the delay lines are applied to different inputs of respective AND gates 18 and 19. The signals leaving the two AND gates 18 and 19 have wave forms F and G as shown in FIG. 2.

These signals are combined in an OR gate 20 whose output is applied to means 21 which enables the separate detection of isolated bipolarity violations and of double bipolarity violations. The means 21 is constituted by two delay lines 22 and 23, respectively, and by two logic gates 24 and 25. The two delay lines are series connected and receive the combined signal which leaves the OR gate 20. The individual delays of these delay lines is identical to that of the delay lines 16 and 17. The two gates 24 and 25 are AND gates; the gate 24 receives the output of the OR gate 20 and the intermediate signal from between the two delay lines 22 and 23. The gate 24 therefore provides a pulse when two pulses pass through the OR gate 20 in successive periods of the A pulse train. The other AND gate 25 has two inversion inputs, which are connected respectively to the output of the gate 20 and to the output of the last delay line 23. The AND gate 25 also receives the signal from between the two delay lines 22 and 23 on a third, non-inverting input. The output of the AND gate 25 is therefore energized when, in three successive periods of the main pulse train, there is only one pulse at the output of the OR gate 20, which pulse is surrounded by two periods without a pulse.

The output of the AND gate 24 is connected to an output 27 of the receiver whose signals are shown as waveform C' in FIG. 2. To within one fixed delay, this signal is identical to the derived pulse train whose frequency is F/k.N (waveform C).

The output of the AND gate 25 is connected to an output 28 of the receiver; the signals at this output are shown as wave form B' in FIG. 2. To within one fixed delay, this signal is identical to the derived pulse train having a frequency of F/N (waveform B).

The main pulse train is reconstituted by an OR gate 29, which receives the partial trains from the diode 33 and from the diode 34 and the inverter 35, respectively, on its two inputs. To within a (negligible) fixed delay, the output of the OR gate 29 is identical to the original main pulse train waveform A). The output of this gate is therefore connected to an output 30 of the receiver, whose signals are shown as waveform A' in FIG. 2.

The invention is not limited to the example of embodiment described in detail. The values of F, N and k can be chosen over a very wide range. A pulse train whose high-level to low-level ratio is different from 1 can also be chosen for the main pulse train; pulse forming stages and a stepped synchronisation can be brought into the system according to the invention, where the reaction time of the components of the circuit is greater than or on the order of magnitude of the period of the main pulse train.

The invention can also be applied to the simultaneous transmission of more than two derived signals, the third signal being coded by three successive violations of bipolarity or in two violations of bipolary separated by one period of the main pulse train.

What is claimed is:

1. A system for transmitting a main pulse train at a main frequency and at least two derived pulse trains at submultiples of the main frequency, the frequencies and phase positions of the derived pulse trains being so chosen that the pulses of the derived pulse trains do not coincide, the system comprising:
   a transmitter and a receiver connected by a transmission path, said transmitter including
   a bipolar signal generator having an input for receiving the main pulse train and an output at which alternate pulses of the main pulse train applied at said input appear as pulses of alternate polarity, and
   means for inhibiting the alternation of the polarity of the output of said bipolar signal generator, respective pulses of said at least two derived pulse trains coinciding with pulses of said main pulse train, said inhibiting means being connected to receive as inputs said at least two derived pulse trains, a first one of said derived pulse trains being applied directly to inhibit the alternation of the polarity of the output of said bipolar signal generator to create a single violation and each pulse of a second one of said derived pulse trains causing the inhibition of the alternation of the polarity of the output of said bipolar signal generator for two successive pulse periods of said main pulse train to create a double violation,
   said receiver including means for detecting the single and double violations of bipolarity.

2. A system according to claim 1 wherein the second derived pulse train is at a frequency which is a submultiple of the frequency of the first derived pulse train.

3. A system as recited in claim 1 wherein said receiver further comprises means for deriving an output substantially identical to said main pulse train.

4. A system as recited in claim 1 wherein said means for inhibiting comprises:
   a monostable connected to receive the second one of said derived pulse trains, said monostable generating an output pulse having a period on the order of two successive pulse periods of said main pulse train,
   an OR gate receiving as inputs the first one of said derived pulse trains and the output of said monostable, and
   a first AND gate receiving as one input said main pulse train and as an inhibiting input the output of said OR gate, the output of said first AND gate being the trigger input to said bipolar signal generator.

5. A system as recited in claim 4 wherein said bipolar signal generator comprises:
   a bistable receiving said trigger input from said first AND gate,
   second and third AND gates each connected to receive as an input a respective one of the outputs of said bistable, said second and third AND gates further connected to receive as inputs said main pulse train, and
   a differential amplifier having its positive and negative inputs connected respectively to the outputs of said second and third AND gates.

6. A system as recited in claim 1 wherein said means for detecting single and double violations of bipolarity comprises:
   means for separating positive and negative polarity pulses in the received signal,
   checking means connected to said means for separating for providing an output pulse in response to two successive pulses having the same polarity, and means responsive to the output pulse of said checking means for isolating single and double bipolarity violations.

7. A system as recited in claim 6 wherein said means for isolating comprises:
   first and second delay lines connected in series, each of said delay lines providing a delay equal to one pulse period of said main pulse train and the input of said first delay line being connected to receive the output pulses from said checking means, and
   first and second AND gates, the output of said first delay line being connected as an input to each of said first and second AND gates, the output of said checking means being connected as an input said first AND gate and as an inhibiting input to said second AND gate, and the output of said second delay line being connected as an inhibiting input to said second AND gate, the output of said first AND gate corresponding to the second of said derived pulse trains and the output of said second AND gate corresponding to the first of said derived pulse trains.

8. A system as recited in claim 7 further comprising:
   means for inverting the separated negative polarity pulses in the received signal, and
   means for combining the separated positive polarity pulses in the received signal with the inverted separated negative polarity pulses to produce an output substantially identical to said main pulse train.

* * * * *